United States Patent Office 3,445,478
Patented May 20, 1969

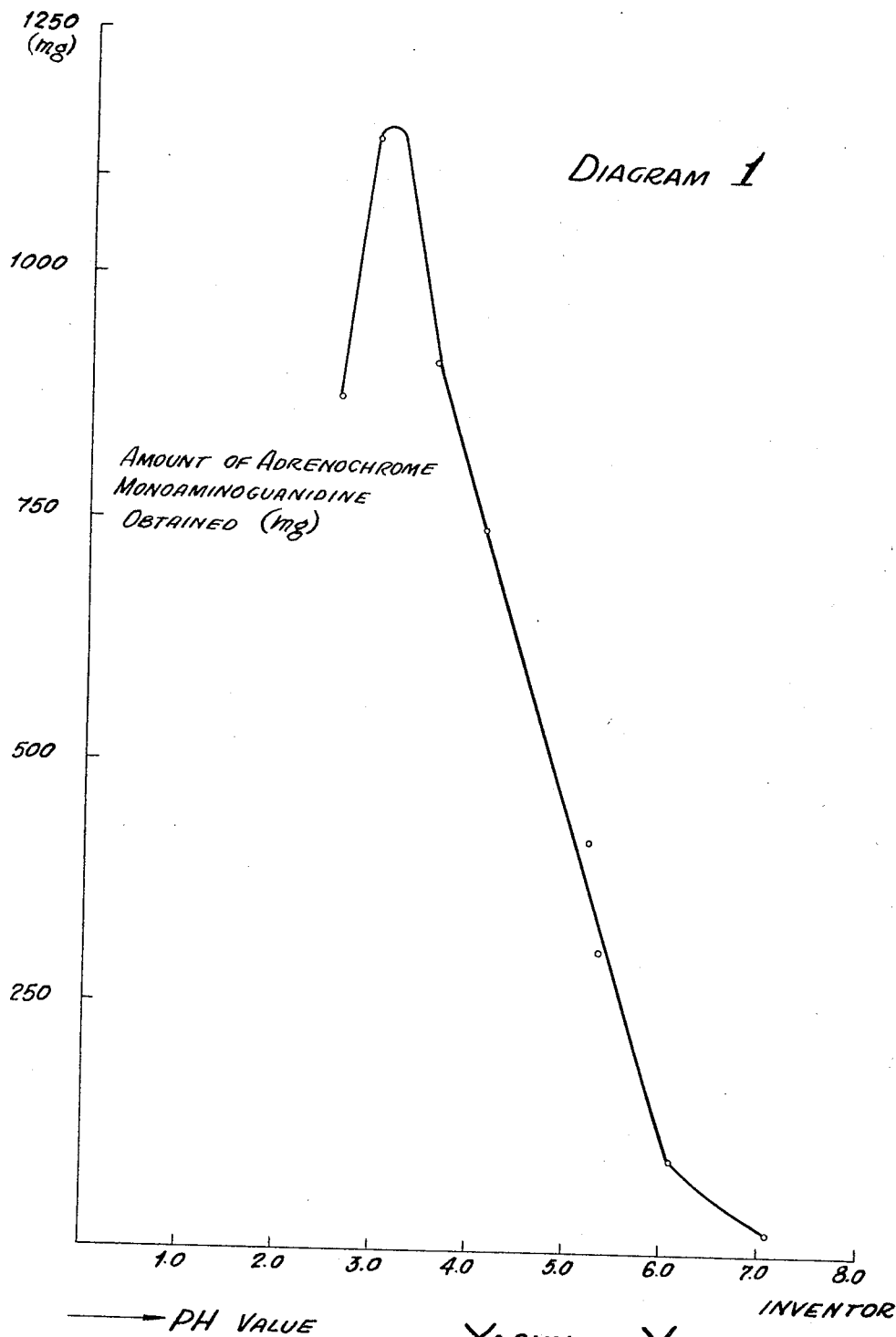

3,445,478
METHOD OF SYNTHESIZING ADRENOCHROME MONOAMINOGUANIDINE
Yasuhito Yamanishi, Suita, Osaka, Japan, assignor to Shiraimatsu Shinyaku Kabushiki Kaisha, Osaka, Japan, a corporation of Japan
Continuation-in-part of application Ser. No. 281,029, May 16, 1963. This application Oct. 15, 1965, Ser. No. 496,434
Int. Cl. C07d 27/34; A61k 27/00
U.S. Cl. 260—326.15                6 Claims This is a continuation-in-part of U.S. application Ser. No. 281,029, filed May 16, 1963, by Yasuhito Yamanishi, now abandoned.

The present invention relates to a process of making a hemostatic and capillary-stabilizing agent, and more particularly a new derivative of adrenochrome, namely adrenochrome monoaminoguanidine, which can be made into salts sufficiently soluble in water.

Adrenochrome and its derivatives have excellent hemostatic and capillary-stabilizing actions. It is said that there are various factors in hemostatic action, which are generally classified into two groups; one, the capillary factors, and the other, the blood coagulation factors. For instance, capillary permeability and capillary reaction to blood pressure belong to the former group, while production of thromboplastin and its change into prothrombin fibrinogen belong to the latter one. Many fundamental experiments showed that adrenochrome and its derivatives shorten bleeding time, and that they inhibit increase of capillary permeability remarkably, while they do not shorten blood coagulation time. It will therefore be said, taking other results of fundamental experiments into account together, that adrenochrome and its derivatives exercise influence not on the blood coagulation factors, but on the capillary factors, though there have been some attempts to show that they influence factors of both groups. It was also shown in many fundamental experiments that 5 to 10 mg./kg. of adrenochrome or 100 to 300 mg./kg. of adrenochrome derivative has no toxicity at all, and that even a dose, maximum from the standpoint of water solubility, of adrenochrome derivative causes no side effects when given intravenously, intraperitoneally, sub cutaneously or orally. In other words, adrenochrome and its derivatives have almost no toxicity, which fact increases the excellence of their pharmacological effects all the more.

One of the conventional adrenochrome derivatives most often prepared in hemostatic and capillary-stabilizing drugs is adrenochrome monosemicarbazone, which has the following structure:

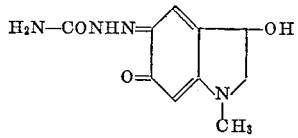

It is now in increasing demand, because of its good hemostatic and capillary-stabilizing effects.

Practically, however, adrenochrome monosemicarbazone cannot be prepared satisfactorily at high density for aqueous dosage, especially for injection, because it is not sufficiently soluble in water, that is, only 0.5 mg. of it is soluble in 1 ml. of water at 20° C. It will, therefore, be required to add a solubilizer or employ some other special methods, in order to prepare adrenochrome monosemicarbazone for aqueous dosage, especially for injection, that is, to prepare it more than 5 mg. in 1 ml. of water. However, addition of solubilizer by a large quantity will raise some clinical problems. For instance, conventionally, 5,000 mg./100 cc. of sodium salicylate is added to solubilize adrenochrome monosemicarbazone for injection use. Such a large dose of sodium salicylate induces some side effects, because it stimulates the action of hyaluronidase, and because it has some other pharmacological actions. The present invention has overcome the above-described faults of conventional adrenochrome derivaitves.

A major object of the invention is to synthesize a derivative of adrenochrome—namely, adrenochrome monoaminoguanidine—which can be changed into salts being so much soluble in water that they may be prepared satisfactorily at high density for aqueous dosage, especially for injection.

Another important object of the invention is to synthesize a derivative of adrenochrome—namely, adrenochrome monoaminoguanidine, which is superior in hemostatic and capillary-stabilizing actions with negligible toxicity.

Other objects and various advantages of the invention will be readily appreciated as the same becomes better understood by reference to the following detailed description.

In the present invention, the novel derivative of adrenochrome—namely, adrenochrome monoaminoguanidine, is synthesized by a dehydrating reaction of adrenochrome and aminoguanidine. Andrenochrome has the following structure:

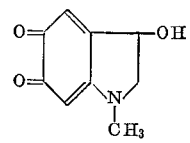

Aminoguanidine has the following structure:

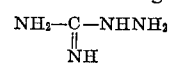

Therefore, adrenochrome monoaminoguanidine synthesized by a dehydrating reaction of the two has the following structure:

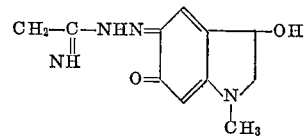

It is well known that aminoguanidine reacts on an aromatic ketone or aldehyde, to bring forth a product which is very likely to crystallize. In the invention, therefore, the ketone radical in adrenochrome is made to react with the $NH_2$ radical in aminoguanidine. In practice, aqueous solution of adrenochrome is added with a salt of aminoguanidine, for instance, nitrate, together with some catalytic acid such as nitric acid, and adrenochrome monoaminoguanidine is crystallized in orange color when the solution is alkalized with ammonia or caustic soda. Ammonia or caustic soda is added here, because adrenochrome monoaminoguanidine, which is alkaline, precipitates and is recovered as a crystal. The orange-color crystalline product is then dissolved in aqueous solution of acetic acid. Adrenochrome monoaminoguanidine is crystallized in the refined state when the solution is alkalized with caustic soda.

Aminoguanidine nitrate is produced by a conventional method. For instance, it is produced by the reaction of nitric acid and aminoguanidine bicarbonate, which is, in turn, produced by the reduction of nitroguanidine with acetic acid and zinc.

Adrenochrome is also produced by a conventional method. For instance, it is produced by the oridization of adrenaline with silver oxide or potassium ferricyanide.

Table 1.—Relation between yield of adrenochrome monoaminoguanidine and addition of reagent Reagent:      Yield of adrenochrome monoaminoguanidine
- Sodium bicarbonate, equimol. ____ A slight quantity
- Sodium hydroxide, equimol. _____ mg__ 39
- Nitric acid, 0.05 ml. _____ mg__ 380
- Nitric acid, 0.20 ml. _____ mg__ 960

In the reaction of adrenochrome and aminoguanidine nitrate, according to the invention, yields of adrenochrome monoaminoguanidine depends on the reagent in the reaction. For instance, in case 1.0 gm. of adrenochrome is put into reaction, the relation between the yield of adrenochrome monoaminoguanidine and the addition of reagent is shown in Table 1. A strikingly better yield is made in the acid side than in the weak alkali side, because a mineral acid, such as nitric acid, gives catalytic acceleration to the reaction of adrenochrome and aminoguanidine nitrate. However, addition of too much acid is not preferable, because it decomposes adrenochrome monoaminoguanidine.

The following experiment shows more in detail the relationship between the pH values of the reaction solution and the amounts obtained of adrenochrome monoaminoguanidine. In this experiment sulphate is used as aminoguanidine salt. When 1.0 gm. of adrenaline is oxidized, 0.978 gm. of adrenochrome is theoretically obtained. With the addition of aminoguanidine sulphate and sulphuric acid, or other acid, the solution is reacted, and the varying amounts obtained of adrenochrome monoaminoguanidine are weighed. Adrenochrome monoaminoguanidine, when 10% sodium hydroxide is added 25 minutes after the addition of aminoguanidine solution, crystallizes and precipitates. The amounts of adrenochrome monoaminoguanidine obtained under various pH values, through the catalyzation with mineral acid, are shown in Table 2 and compared with that obtained without acid or with an alkaline substance.

TABLE 2

| Reagent added together with aminoguanidine salt | pH of reaction solution | Amount obtained of adrenochrome monoaminoguanidine, mg. |
|---|---|---|
| 20 ml. 5% $H_2SO_4$ | 2.58 | 878 |
| 15 ml. 5% $H_2SO_4$ | 2.90 | 1,143 |
| 10 ml. 5% $H_2SO_4$ | 3.58 | 911 |
| 7 ml. 5% $H_2SO_4$ | 4.14 | 747 |
| 5 ml. 5% $H_2SO_4$ | 5.23 | 424 |
| 3 ml. 5% $H_2SO_4$ | 5.32 | 308 |
| Nil | 6.10 | 96 |
| 20 ml. 5% $NaHCO_3$ | 7.05 | 25 |

The same results are shown in Diagram 1. It is found that the greatest amounts of adrenochrome monoaminoguanidine are obtained under pH 2.5 to 4.2, and that the amounts go down remarkably as pH values differ from this range. When the pH is significantly less than approximately 2.5, the yields decrease because of the dissolution of adrenochrome, while reaction solutions of pH greater than about 5.3 result in yields decreasing, too, because the decomposition of adrenochrome and monoaminoguanidine does not go on well. So the pH values found to be most useful range from about 2.0 to 5.3—an important condition in this reaction. Mineral acids, such as nitric acid, sulphuric acid, and organic acids, such as acetic acid, are used to oxidize the reaction solution, but any other acids can also be used, as long as they do not decompose or react with adrenochrome monoaminoguanidine. Such other acids are hydrochlroic acid, hydrobromic acid, formic acid, and phosphoric acid.

The present invention shows that the decomposition of adrenochrome likely to occur under the above-mentioned pH range does not take place, that even if the decomposition should take place, it would be only negligible, and that therefore adrenochrome and aminoguanidine can be reacted with good results.

Now an experiment for synthesizing adrenochrome monoaminoguanidine will be described as an example embodying the present invention. A solution of 1.0 gm. adrenochrome and 50 ml. water is taken in a 200 ml. three-neck round-bottled flask equipped with an agitator. A mixture of 0.75 gm. aminoguanidine nitrate, 0.2 ml. nitric acid, and 5 ml. water is added into the aqueous solution of adrenochrome through a funnel attached to the side of the flask, while the latter is agitated. About 30 minutes later, 20 ml. of 20% ammonia water is added, and then adrenochrome monoaminoguanidine is precipitated in the state of orange-color crystal. The precipitated crystalline product is separated with a Büchner funnel and washed with water. The washed crystalline product is dissolved in 10 ml. of 3% acetic acid aqueous solution. After filtering the solution is alkalized with 15 ml. of 10% caustic soda aqueous solution, and then about 0.9 gm. of refined adrenochrome monoaminoguanidine is yielded as an orange-color needle crystal. The needle crystal is soluble in hydochloric acid. It is not very soluble in water, alcohol, and acetone. Its melting point is 195 to 200° C., at which point it is decomposed.

Another experiment for synthesizing adrenochrome monoaminoguanidine will be described as an example also embodying the invention. A solution of 34.1 gm. potassium ferricyanide, 11.2 gm. sodium bicarbonate and 80 ml. water is taken in a 200 ml. beaker. A mixture of 5 gm. adrenaline and 50 ml. of 3% acetic acid aqueous solution is added through a funnel into the solution taken in the 200 ml. beaker, while the latter is agitated. One minute later, a mixture of 1 ml. acetic acid aqueous solution, 3.8 gm. of aminoguanidine nitrate and 20 ml. water is added similarly. Potassium ferricyanide is used to oxidize adrenaline into adrenochrome, and sodium bicarbonate is used to make potassium ferricyanide discharge oxygen through the reaction given below:

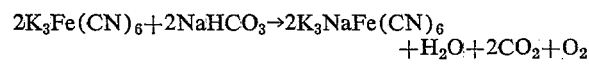

$$2K_3Fe(CN)_6 + 2NaHCO_3 \rightarrow 2K_3NaFe(CN)_6 + H_2O + 2CO_2 + O_2$$

The right side of this formula shows the state before the addition of aminoguanidine nitrate, and the pH is 6.20. When the addition is over, the pH goes down to 6.10. The reason for the pH of 6.20 is the use of acetic acid to dissolve adrenaline. The foregoing shows that the solution is slightly acid.

Ten minutes later the solution is alkalyzed with 10% caustic soda aqueous solution, and then about 5.1 gm. of adrenochrome monoaminoguanidine is precipated in the state of orange-color crystal, which will be refined just in the same manner as described in the previously described example experiment. The refined product is an orange-color needle crystal which is soluble in hydrochloric acid, not much soluble in water, alcohol and acetone, and is melted at 195° to 200° C., where it is decomposed.

Still another experiment follows: 7.0 gm. of potassium ferricyanide and 2.5 gm. of sodium bicarbonate are dissolved in 22 ml. of water in a 100 ml. beaker. While this solution is agitated, a mixture of 1.0 gm. of adrenaline and 11 ml. of 3% acetic acid aqueous solution is added to the solution with a tap funnel. A minute later, a mixture of 0.61 gm. of aminoguanidine, 15 ml. of 5% sulphuric acid and 5 ml. of water is added similarly to the solution. As soon as 10 ml. of 10% caustic soda solution is added about 25 minutes later to make the solution alkaline, orange-colored adrenochrome monoaminoguanidine is separated. This is filtered with a Büchner funnel, washed with water and dried. When it is refined in the same way as above, about 1.1 gm. of orange-colored needle-shaped crystal adrenochrome monoaminoguanidine, with melting points of 195° to 200° C. is obtained.

Acids to be added as much as in the above-described example experiments will not decompose adrenochrome, but gives a good yield of adrenochrome monoaminoguanidine. Heating is not necessary in the above-described experiments.

Adrenochrome monoaminoguanidine obtained in the present invention is changed into salts for aqueous dosage, especially for injection, in view of the fact that salts of adrenochrome monoaminoguanidine are sufficiently soluble in water.

To obtain adrenochrome monoaminoguanidine salts, adrenochrome monoaminoguanidine is dissolved in an acid diluted with water. To obtain crystals, the aqueous solution so obtained is added to a water-soluble organic solvent. The crystalline product is dissolved in water and added to the above-mentioned organic solvent. When the solution is cooled, the salt of adrenochrome monoaminoguanidine is obtained in the refined crystalline state.

The acid to dissolve adrenochrome monoaminoguanidine in the salt-making reaction of the invention can be any non-toxic acid, for example: inorganic acids, such as sulphuric, nitric, and hydrochloric; organic carboxylic acids, such as acetic, formic, citric, tartaric; and organic sulphonic acids, such as methane sulphonic, ethane sulphonic, and hydroxymethane sulphonic. The amount of acid addition is not critical, but should not be such as to decompose adrenochrome monoaminoguanidine.

The organic solvent to add in making the above-mentioned salts can be any liquid solvent for adrenochrome monoaminoguanidine which is inert to this substance, any alcohol, such as methyl alcohol, and ethyl alcohol, acetone, all mixtures of an alcohol and ether, and all mixtures of acetone and ether It is advisable to use an ethylalcohol solution including ether of less than about 50%, such as a mixture of 60 ml. of ethyl alcohol and 40 ml. of ether, or an acetone solution including ether of less than about 30%, such as a mixture of 80 ml. of acetone and 20 ml. of ether.

An experiment for changing adrenochrome monoaminoguanidine into the hydrochloride will be described as in example. A solution of 30 ml. water and 15 ml. of 37% hydrocloric acid is taken in a 200 ml. Erlenmeyer flask. 5.1 gm. of unrefined adrenochrome monoaminoguanidine is dissolved at 40 to 50° C. in the solution taken in the Erlenmeyer flask. The solution is filtered through a funnel. The filtered solution is taken in a 1,000 ml. Erlenmeyer flask, and 450 ml. acetone is added into it. When the solution is cooled, adrenochrome monoaminoguanidine hydrochloride is precipitated in the crystalline state. The crystalline product is separated with a Büchner funnel, washed with acetone, and air-dried. The air-dried crystalline product is dissolved in 100 ml. water in a 200 ml. Erlenmeyer flask. After filtered through a funnel, the solution is taken in a 700 ml. Erlenmeyer flask, and 400 ml. acetone is added into it. When the solution is cooled, about 3.8 gm. adrenochrome monoaminoguanidine hydrochloride is yielded in the state of refined deep-red needle crystal. Adrenochrome monoaminoguanidine hydrochloride is sufficiently soluble in water—that is, 12 mg. of it is soluble in 1 ml. of water at 20° C. But it is not much soluble in alcohol, insoluble in acetone, chloroform and benzene. Its melting point is 235 to 240° C., where it is decomposed. Adrenochrome monoaminoguanidine hydrochloride yielded in the experiment is $C_{10}H_{14}O_2N_5Cl$ containing: Calc. C, 44.20%; H, 5.19%; N, 25.78%. Found: C, 44.20%; H, 5.12%; N, 24.73%.

An experiment for changing adrenochrome monoaminoguanidine into the formate will be described as a further example. A solution of 35 ml. water and 0.23 gm. formic acid is taken in a 100 ml. Erlenmeyer flask. 1.18 gm. of unrefined adrenochrome monoaminoguanidine is dissolved at 50° to 60° C. in the solution taken in the Erlenmeyer flask. The solution is filtered through a funnel. The filtered solution is taken in a 200 ml. flask, and added with 100 ml. alcohol and 10 ml. ether. When the solution is cooled down to 0° C., adrenochrome monoaminoguanidine formate is precipitated in the crystalline state. The crystalline product is separated with a funnel. The separated crystalline product is dissolved in 15 ml. water in a 50 ml. Erlenmeyer flask, and added with 80 ml. alcohol and 10 ml. ether. When the solution is cooled, about 0.95 gm. adrenochrome monoaminoguanidine formate is yielded in the state of refined orange-color needle crystal. Adrenochrome monoaminoguanidine formate is sufficiently soluble in water, that is, 15 mg. of it is soluble in 1 ml. of water at 20° C. Its melting point is 218° C., where it is decomposed. Adrenochrome monoaminoguanidine formate yielded in the experiment is $C_{11}H_{14}N_5O_4$ containing: Calc. C, 46.97%; H, 5.36%; N, 24.90%. Found: C, 47.13%; H, 5.34%; N, 25.00%.

In Table 3 some other salts of adrenochrome monoaminoguanidine are listed, which are obtained in similar fashion following the foregoing examples.

As shown in Table 3, salts of adrenochrome monoaminoguanidine are, in general, sufficiently soluble in water. They are much more soluble in water than the conventional derivative of adrenochrome—namely, adrenochrome monosemicarbazone, which is soluble only 0.5 mg. in 1 ml. of water. For instance, adrenochrome monoaminoguanidine methanesulfonate synthesized according to the present invention is soluble 110 mg. in 1 ml. of water, as shown in Table 3. Salts of adrenochrome monoaminoguanidine synthesized in the invention can be prepared satisfactorily at high density for aqueous dosage, especially for injection, due to their high solubility in water. No solubilizer is required in preparing aqueous solution of adrenochrome monoaminoguanidine sales synthesized in the present invention. Accordingly, they will raise no such clinical problems as attributed to a large-quantity addition of solubilizer, for instance, of sodium salicylate, which is required to solubilize a sufficient dose of the conventional adrenochrome monosemicarbazone in water.

TABLE 3.—SALES OF ADRENOCHROME MONOAMINOGUANIDINE

| Salt: | Appearance | Melting Point | Solubility in Water (at 20° C.) |
|---|---|---|---|
| Hydrochloride | Deep red, Needle crystal | 235° to 240° C | 12 mg./ml. |
| Sulfate | Brown, Needle crystal | 185° C | 10 mg./ml. |
| Formate | Deep orange, Needle crystal | 218° C | 15 mg./ml. |
| Acetate | Orange, Needle crystal | 174° to 175° C | 10 mg./ml. |
| Tartrate | Brown, Needle crystal | 171° C | 10 mg./ml. |
| Citrate | Dark red, Needle crystal | 190° to 191° C | 15 mg./ml. |
| Ethyl sulfate | Deep orange, Needle crystal | 208° C | 10 mg./ml. |
| Methane sulfonate | Orange, Needle crystal | 207° C | 110 mg./ml. |
| Oxymethane sulfonate | Deep orange, Needle crystal | 210° C | 115 mg./ml. |

Adrenochrome monoaminoguanidine and its salts synthesized according to the present invention have superior hemostatic and capillary-stabilizing actions which were shown clearly in not a few animal experiments carried out by the inventor and his many co-operators. Animals showed apparent shortening of bleeding time, 5 to 10 minutes after they were injected intravenously 0.1 to 0.4 mg./kg. with adrenochrome monoaminoguanidine sulphate or methanesulfonate, while they showed no changes in blood coagulation time. Animals, weighing 2 kg. each, dosed 0.1 to 1γ of adrenochrome monoaminoguanidine salt cutaneously, showed apparent inhibition of increase in capillary permeability caused by histamine. A cutaneous dose of 1γ adrenochrome monoaminoguanidine salt inhibited the action of hyaluronidase significantly in animals weighing 2 kg. each. A dose of 0.1 to 0.4 mg./kg. of adrenochrome monoaminoguanidine salt injected intravenously had a significant preventive effect on the petechia formation caused by application of negative pressure. Adrenochrome monoaminoguanidine salt dosed 1 to 3 mg./kg. had a definite protective effect on pneumorrhagia induced by pressure lowering. No significant changes were noted in blood pressure, respiration and ECG, when adrenochrome monoaminoguanidine salts were injected intravenously. In some other experiments adrenochrome monoaminoguanidine salt showed a restorative effect on muscular fatigue.

Adrenochrome monoaminoguanidine and its salts synthesized in the present invention have almost no toxicity. In animal experiments, no mouse weighing 10 gr. died even after subcutaneous injection of 8 mg. adrenochrome monoaminoguanidine sulphate. The $LD_{50}$ of adrenochrome monoaminoguanidine sulphate injected intraperitoneally in the mouse was 11.75 mg./10 gr., while that of methanesulfonate was 18.4 mg./10 gr. Indeed, adrenochrome monaminoguanidine and its water-soluble salts are superior in hemostatic and capillary-stabilizing actions with negligible toxicity.

The inventor has a large stock of clinical reports on salts of adrenochrome monoaminoguanidine, summarized that; in the internal fields, they were effective 90% for chronic nephritis, 67% for hemorrhagic diathesis, 100% for purpura, 100% for epistaxis, while in the dermatological and urological fields, they were effective 100% for acute eczema, 100% for urticaria, 100% for dermatitis, 100% for epidymectomy, 100% for tumorectomy, 100% for nephrectomy, and in the obstetrical and gynecological fields, they were effective 95% for functional uterous bleeding, 90% for poste partum bleeding. Besides all these, they were reported to have remarkable effects in prevention and treatment of proctorrhagia, menorrhagia, ulorrhagia, pneumorrhagia, retinal hemorrhage, gastrointestinal hemorrhage, idiopathic renal hemorrhage, hemato-nephrophthisis, and further, they were reported to be effective for prevention and treatment of bleedings and extravasations after surgical operations, diseases due to capillary fragility, such as perniones, simple purpura, erythema exsudativum multiforme and so on. No side effects were reported.

It will be said from the above-summarized clinical reports that adrenochrome monoaminoguanidine and its salts sythesized in accordance with the present invention will be prepared as excellent hemostatic and capillary-stabilizing agents with negligible side effects.

I claim:

1. The process of producing adrenochrome monoaminoguanidine, comprising the steps of reacting adrenochrome in an acid solution with aminoguanidine while maintaining the pH between 2.5 and 3.58 and precipitating adrenochrome monoaminoguanidine with the addition of alkali.

2. The process of claim 1, wherein said acid solution comprises acetic acid and wherein the alkali is caustic soda.

3. The process of producing a non-toxic salt of adrenochrome monoaminoguanidine, comprising reacting adrenochrome in an aqueous solution with aminoguanidine while maintaining the pH between 2.5 and 3.58, adding an inert water soluble organic solvent, and collecting the salt of adrenochrome monoaminoguanidine.

4. The process of claim 3, wherein the pH is maintained by acid additions, wherein the acids are selected from the group consisting of mineral acids, sulphuric, nitric and hydrochloric, organic carboxylic acids, selected from the group consisting of acetic, formic, citric and tartaric and organic sulfonic acids, selected from the group consisting of methane sulphonic, ethane sulphonic and hydroxy methane sulphonic, and wherein the solvent is selected from the group consisting of alcohol, acetone, ether, and mixtures thereof.

5. The process of producing adrenochrome monoaminoguanidine by reacting adrenochrome with aminoguanidine in an aqueous solution at a pH of 2.5 to 3.58, the separation of adrenochrome monoaminoguanidine being facilitated by adding a compound selected from the group consisting of alkali, methyl alcohol, ethyl alcohol, and acetone.

6. The process of refining adrenochrome monoaminoguanidine by dissolving adrenochrome monoaminoguanidine obtained in claim 5 in an aqueous solution containing an equivalent amount of acetic acid and adding alkali thereto and reprecipitating said product.

References Cited

UNITED STATES PATENTS

| | | | |
|---|---|---|---|
| 2,506,294 | 5/1950 | Dechamp et al. | 260—326.14 |
| 2,728,772 | 12/1955 | Barsel | 260—295 |

FOREIGN PATENTS

| | | |
|---|---|---|
| 1,231,022 | 9/1960 | France. |
| 3,817,034 | 9/1963 | Japan. |

OTHER REFERENCES

Weissberger, Technique of Organic Chem., vol. 111, pp. 549–559. Interscience Publishers, Inc., New York, 1956.

ALEX MAZEL, *Primary Examiner.*

J. A. NARCAVAGE, *Assistant Examiner.*

U.S. Cl. X.R.

260—999